(12) United States Patent
Hu (10) Patent No.: US 12,289,679 B2
(45) Date of Patent: *Apr. 29, 2025

(54) SYSTEMS AND METHODS FOR QUIET ELEMENT IN TWT FOR WIRELESS COMMUNICATION

(71) Applicant: Meta Platforms Technologies, LLC, Menlo Park, CA (US)

(72) Inventor: Chunyu Hu, Saratoga, CA (US)

(73) Assignee: Meta Platforms Technologies, LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/733,476

(22) Filed: Jun. 4, 2024

(65) Prior Publication Data

US 2024/0323844 A1 Sep. 26, 2024

Related U.S. Application Data

(63) Continuation of application No. 17/516,284, filed on Nov. 1, 2021, now Pat. No. 12,035,236.

(60) Provisional application No. 63/122,217, filed on Dec. 7, 2020.

(51) Int. Cl.
*H04W 52/02* (2009.01)
*H04W 72/0446* (2023.01)

(52) U.S. Cl.
CPC ............ *H04W 52/0229* (2013.01); *H04W 52/0248* (2013.01); *H04W 72/0446* (2013.01)

(58) Field of Classification Search
CPC ......... H04W 52/0229; H04W 52/0248; H04W 72/0446
See application file for complete search history.

(56) References Cited

U.S. PATENT DOCUMENTS

| 11,153,824 | B1 | 10/2021 | Jia et al. |
| 11,528,722 | B2 | 12/2022 | Cavalcanti et al. |
| 2011/0069651 | A1 | 3/2011 | Kangude et al. |
| 2021/0120464 | A1 | 4/2021 | Shen et al. |
| 2022/0070772 | A1 | 3/2022 | Ho et al. |

(Continued)

FOREIGN PATENT DOCUMENTS

WO 2020013874 A1 1/2020

OTHER PUBLICATIONS

Chunyu H., et al., "Prioritized EDCA channel access—slot management," IEEE Draft, Oct. 19, 2020 [Retrieved on Oct. 19, 2020], vol. 802.11 EHT; 802.11be, No. 8, pp. 1-17, Retrieved from the Internet: URL:https://mentor.ieee.org/802.11/dcn/20/11-20-1046-08-00be-prioritized-edca-channel-access-slot-management.pptx.

(Continued)

*Primary Examiner* — Michael Thier
*Assistant Examiner* — Nevena Zecevic Sandhu
(74) *Attorney, Agent, or Firm* — FOLEY & LARDNER LLP (57) ABSTRACT

Disclosed herein are related to a wireless communication. In one aspect, a wireless communication device receives a frame including a first indication that indicates the wireless communication device to disable transmission during a quiet period. The quiet period may overlap with a restricted service period of a restricted target wake time (TWT) schedule of the wireless communication device. In one aspect, the wireless communication device may determine to ignore the first indication for the quiet period based on a defined rule or a separate indication indicating the wireless communication device to ignore the first indication.

20 Claims, 7 Drawing Sheets

(56) References Cited

U.S. PATENT DOCUMENTS

2022/0303902 A1  9/2022  Tao et al.
2023/0262768 A1  8/2023  Ko et al.

OTHER PUBLICATIONS

Chunyu H., et al., "Restricted-TWT-Quiet-Interval-TBD-CR," IEEE Draft, May 11, 2021 [Retrieved on May 11, 2021], vol. 802.11 EHT; 802.11be, No. 5, pp. 1-5, Retrieved from the Internet: URL:https://mentor.ieee.org/802.11/dcn/21/11-21-0683-05-00be-restricted-twt-quiet-interval-tbd-cr.docx.

Hu C., et al., "Prioritized EDCA Channel Access—Slot Management," IEEE Draft, Dec. 9, 2020, vol. 802.11 EHT; 802.11 be, No. 10, pp. 1-20, Retrieved from the Internet: URL: https://mentor.ieee.org/802.11/dcn/20/11-20-1046-10-00be-prioritized-edca-channel-access-slot-management.pptx, [Retrieved on Dec. 9, 2020].

International Search Report and Written Opinion for International Application No. PCT/US2021/062012, mailed May 9, 2022, 11 pages.

SYSTEMS AND METHODS FOR QUIET ELEMENT IN TWT FOR WIRELESS COMMUNICATION

CROSS-REFERENCE TO RELATED APPLICATION

This application claims the benefit of priority under 35 U.S.C. § 120 as a continuation of U.S. Non-Provisional patent application Ser. No. 17/516,284, filed on Nov. 1, 2021, which claims priority to U.S. Provisional Patent Application No. 63/122,217, filed on Dec. 7, 2020, the disclosure of each of which is incorporated by reference herein in its entirety.

FIELD OF DISCLOSURE

The present disclosure is generally related to communication for rendering artificial reality, including but not limited to reducing latency in communication for artificial reality.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

In one implementation, an image of a virtual object is generated by a console communicatively coupled to the HWD. In one example, the HWD includes various sensors that detect a location and/or orientation of the HWD, and transmits the detected location and/or orientation of the HWD to the console through a wired connection or a wireless connection. The console can determine a user's view of the space of the artificial reality according to the detected location and/or orientation of the HWD, and generate image data indicating an image of the space of the artificial reality corresponding to the user's view. The console can transmit the image data to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

SUMMARY

Disclosed herein are related to a method for wireless communication. In some embodiments, the method includes receiving, by a wireless communication device from a wireless communication node, a frame including a first indication to the wireless communication device to disable transmission during a quiet period. In some embodiments, the method includes determining, by the wireless communication device, to ignore the first indication for the quiet period, if the quiet period overlaps with a restricted service period of a restricted target wake time (TWT) schedule of the wireless communication device.

In some embodiments, the method includes performing or enabling, by the wireless communication device, a transmission during the quiet period, according to the determining. In some embodiments, determining to ignore the first indication includes determining, by the wireless communication device, to ignore the first indication according to a configuration or default rule.

In some embodiments, determining to ignore the first indication includes receiving, by the wireless communication device from the wireless communication node, a second indication, and determining, by the wireless communication device, to ignore the first indication responsive to the received second indication. In some embodiments, the second indication includes: a defined value in a broadcast recommendation subfield, or a defined bit value in a broadcast TWT information subfield. In some embodiments, the broadcast recommendation subfield or the broadcast TWT information subfield is in a TWT information element (IE). In some embodiments, the broadcast recommendation subfield or the broadcast TWT information subfield is in a beacon frame, a probe response frame or a basic service set (BSS) discovery frame. In some embodiments, the method includes receiving, by the wireless communication device from the wireless communication node, an updated second indication after receiving the second indication; and determining, by the wireless communication device, to enable or perform transmission during the quiet period, responsive to the updated second indication. In some embodiments, the second indication is received during a setup procedure between the wireless communication device and the wireless communication node.

Various embodiments disclosed herein are related to a wireless communication device. In some embodiments, the wireless communication device includes a receiver configured to receive, from a wireless communication node, a frame including a first indication to the wireless communication device to disable transmission during a quiet period. In some embodiments, the wireless communication device includes at least one processor configured to ignore the first indication for the quiet period, if the quiet period overlaps with a restricted service period of a restricted target wake time (TWT) schedule of the wireless communication device.

In some embodiments, the at least one processor is further configured to perform or enable a transmission during the quiet period, by/in (or in response to) ignoring the first indication. In some embodiments, the at least one processor is configured to ignore the first indication according to a configuration or default rule. In some embodiments, the receiver is configured to receive, from the wireless communication node, a second indication, and the at least one processor is configured to ignore the first indication responsive to the received second indication. In some embodiments, the second indication comprises: a defined value in a broadcast recommendation subfield, or a defined bit value in a broadcast TWT information subfield. In some embodiments, the broadcast recommendation subfield or the broadcast TWT information subfield is in a TWT information element (IE). In some embodiments, the broadcast recommendation subfield or the broadcast TWT information subfield is in a beacon frame, a probe response frame or a basic service set (BSS) discovery frame. In some embodiments, the receiver is further configured to receive, from the wireless communication node, an updated second indication after receiving the second indication. In some embodiments, the at least one processor is further configured to enable or perform transmission during the quiet period, responsive to the updated second indication. In some embodiments, the second indication is received during a setup procedure between the wireless communication device and the wireless communication node.

Various embodiments disclosed herein are related to a non-transitory computer readable medium storing program instructions for wireless communication. In some embodiments, the program instructions when executed by at least one processor cause the at least one processor to receive, via a receiver from a wireless communication node, a frame including a first indication to the wireless communication device to disable transmission during a quiet period. In some embodiments, the program instructions when executed by the at least one processor cause the at least one processor to determine to ignore the first indication for the quiet period, if the quiet period overlaps with a restricted service period of a restricted target wake time (TWT) schedule of the wireless communication device. In some embodiments, the program instructions when executed by the at least one processor cause the at least one processor to receive, via the receiver from the wireless communication node, a second indication; determine to ignore the first indication responsive to the received second indication. In some embodiments, the program instructions when executed by the at least one processor cause the at least one processor to receive, via the receiver from the wireless communication node, an updated second indication after receiving the second indication. In some embodiments, the program instructions when executed by the at least one processor cause the at least one processor to determine to enable or perform transmission during the quiet period, responsive to the updated second indication.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to coordinating/managing operations of wireless devices that have a capability to support a restricted TWT operation and/or wireless devices that do not have the capability to support the restricted TWT operation.

In one aspect, two or more communication devices may schedule a restricted service period to exchange/communicate latency sensitive data (e.g., data for providing/implementing/rendering artificial reality, such as virtual or augmented reality). During the restricted service period, the two or more communication devices or an access point may transmit a signal or frame causing other devices to refrain from transmitting during the restricted service period to avoid interfering with the communication for the latency sensitive data. While devices that have a capability to support a restricted TWT operation may operate according to such signal or frame, some devices (e.g., legacy Wi-Fi devices) that do not have the capability to support the restricted TWT operation may not respond to the signal or frame and may transmit data or attempt to transmit data during the restricted service period, thereby causing interference.

In one aspect, a quiet element (or a quiet channel element) can be utilized for the devices that do not have a capability to support the restricted TWT operation. A quiet element (or a quiet channel element) may be a signal or frame that causes one or more devices to disable transmission during a quiet period. In one implementation, an access point can use a quiet element to silence/instruct/control associated station devices (STAs) from transmitting, and the access point can measure for channel activities to detect any radar/defined signal. If a radar/defined signal is detected, the access point can/will initiate channel switch to avoid this radar/defined signal. In one aspect, the quiet period may be set to overlap with the restricted service period, such that devices that do not have the capability to support the restricted TWT operation would/can refrain from transmitting during the quiet period according to the quiet element.

In one aspect, a communication device operable according to the restricted TWT operation may selectively respond to the quiet element. For example, the communication device may stop or refrain from any transmission during the quiet period, according to the quiet element. Alternatively, the communication device may ignore the quiet element, and transmit data during the restricted service period irrespective of the quiet element. The communication device may determine to ignore the quiet element or to operate according to the quiet element, based on a defined rule or a separate indication indicating whether the communication device should ignore the quite element.

By implementing the quiet element, one or more devices (e.g., legacy devices) that do not have the capability to support the restricted TWT operation would/may not interfere with the communication of latency sensitive data during a restricted service period, while one or more communication devices that have the capability to support the restricted TWT operation may communicate data during the service period despite the quiet element. While some descriptions herein are provided for communication of artificial reality data, general principles disclosed herein can be applied to any wireless communication.

Figure 1:
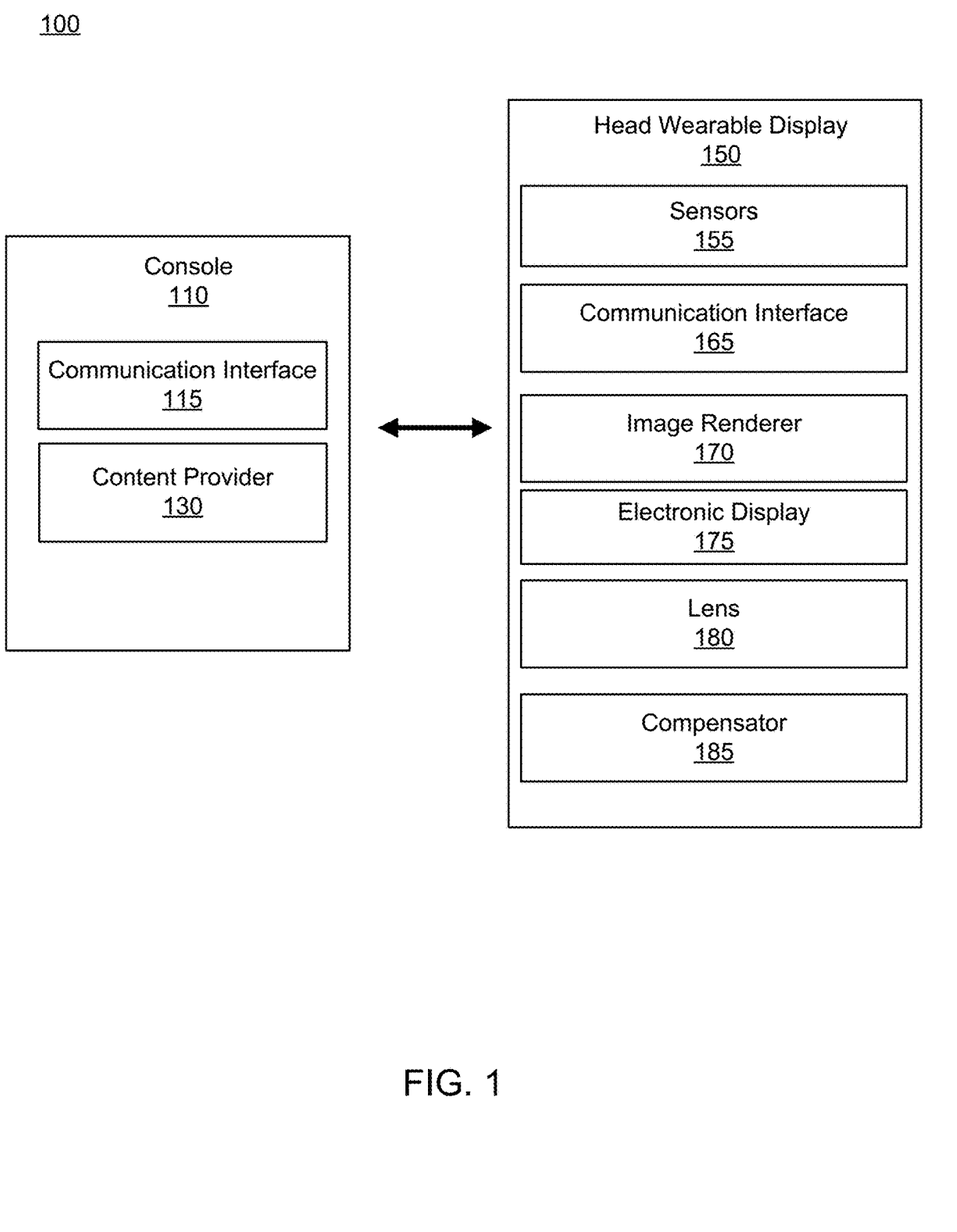
FIG. 1 is a diagram of a system environment including an artificial reality system, according to an example implementation of the present disclosure.

FIG. 1 is a block diagram of an example artificial reality system environment 100. In some embodiments, the artificial reality system environment 100 includes a HWD 150 worn by a user, and a console 110 providing content of artificial reality to the HWD 150. The HWD 150 may be referred to as, include, or be part of a head mounted display (HMD), head mounted device (HMD), head wearable device (HWD), head worn display (HWD) or head worn device (HWD). The HWD 150 may detect its location and/or orientation of the HWD 150 as well as a shape, location, and/or an orientation of the body/hand/face of the user, and provide the detected location/or orientation of the HWD 150 and/or tracking information indicating the shape, location, and/or orientation of the body/hand/face to the console 110. The console 110 may generate image data indicating an image of the artificial reality according to the detected location and/or orientation of the HWD 150, the detected shape, location and/or orientation of the body/hand/face of the user, and/or a user input for the artificial reality, and transmit the image data to the HWD 150 for presentation. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the sensors 155 include eye trackers. The eye trackers may include electronic components or a combination of electronic components and software components that determine a gaze direction of the user of the HWD 150. In some embodiments, the HWD 150, the console 110 or a combination of them may incorporate the gaze direction of the user of the HWD 150 to generate image data for artificial reality. In some embodiments, the eye trackers include two eye trackers, where each eye tracker captures an image of a corresponding eye and determines a gaze direction of the eye. In one example, the eye tracker determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers incorporate the orientation of the HWD 150 and the relative gaze direction with respect to the HWD 150 to determine a gate direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers may determine that the gaze direction of the user is 20 degrees from the reference direction. In some embodiments, a user of the HWD 150 can configure the HWD 150 (e.g., via user settings) to enable or disable the eye trackers. In some embodiments, a user of the HWD 150 is prompted to enable or disable the eye trackers.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location and/or orientation of the HWD 150, and/or the determined gaze direction of the user. Moreover, through the communication link, the communication interface 165 may receive from the console 110 image data indicating or corresponding to an image to be rendered and additional data associated with the image.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some embodiments, the image data from the console 110 may be encoded, and the image renderer 170 may decode the image data to render the image. In some embodiments, the image renderer 170 receives, from the console 110 in additional data, object information indicating virtual objects in the artificial reality space and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the HWD 150 in a physical space into a virtual space (or simultaneous localization and mapping (SLAM) data), eye tracking data, motion vector information, depth information, edge information, object information, etc. The console 110 may provide the image data and the additional data to the HWD 150 for presentation of the artificial reality. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, and/or the determined gaze direction of the user. Moreover, through the communication link, the communication interface 115 may transmit to the HWD 150 image data describing an image to be rendered and additional data associated with the image of the artificial reality.

The content provider 130 can include or correspond to a component that generates content to be rendered according to the location and/or orientation of the HWD 150. In some embodiments, the content provider 130 may incorporate the gaze direction of the user of the HWD 150. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. In some embodiments, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some embodiments, the content provider 130 generates and provides the image data to the HWD 150 periodically (e.g., every 11 ms).

Figure 2:
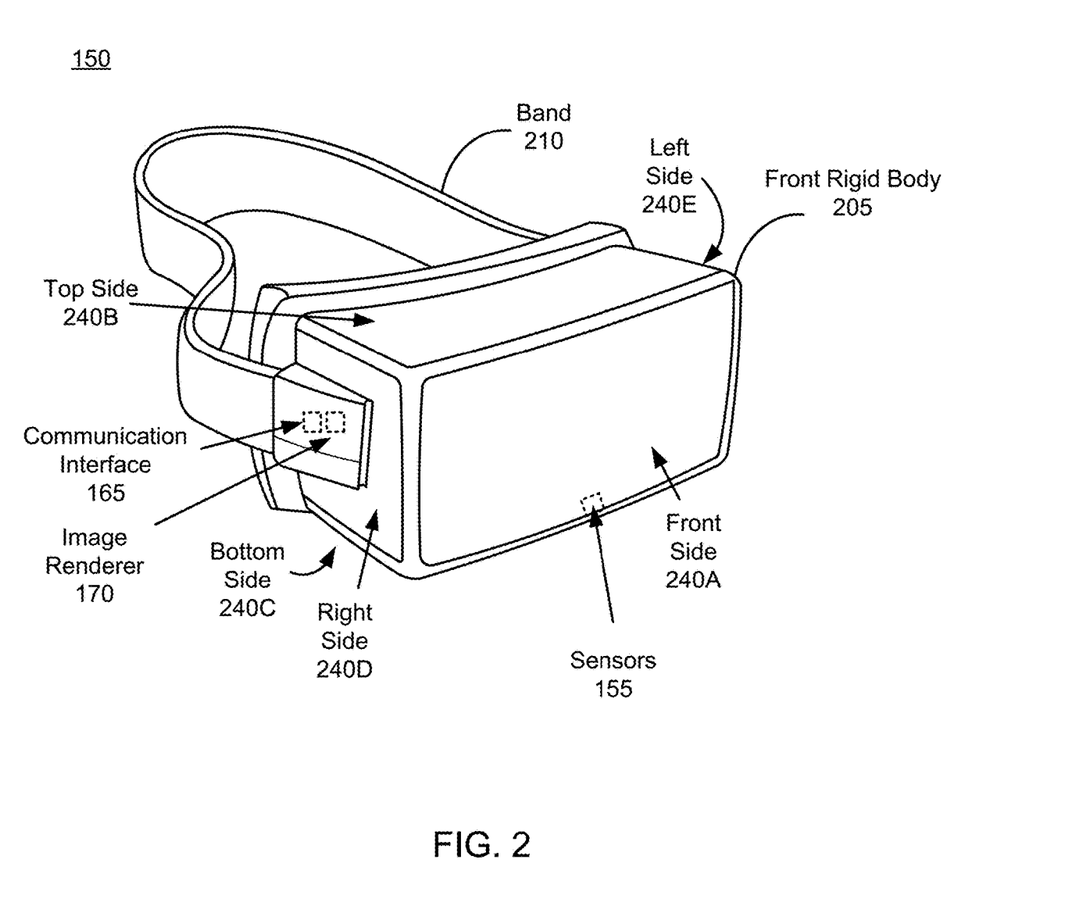
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the communication interface 165, and the image renderer 170. In the embodiment shown by FIG. 2, the communication interface 165, the image renderer 170, and the sensors 155 are located within the front rigid body 205, and may not be visible externally. In other embodiments, the HWD 150 has a different configuration than shown in FIG. 2. For example, the communication interface 165, the image renderer 170, and/or the sensors 155 may be in different locations than shown in FIG. 2.

Figure 3:
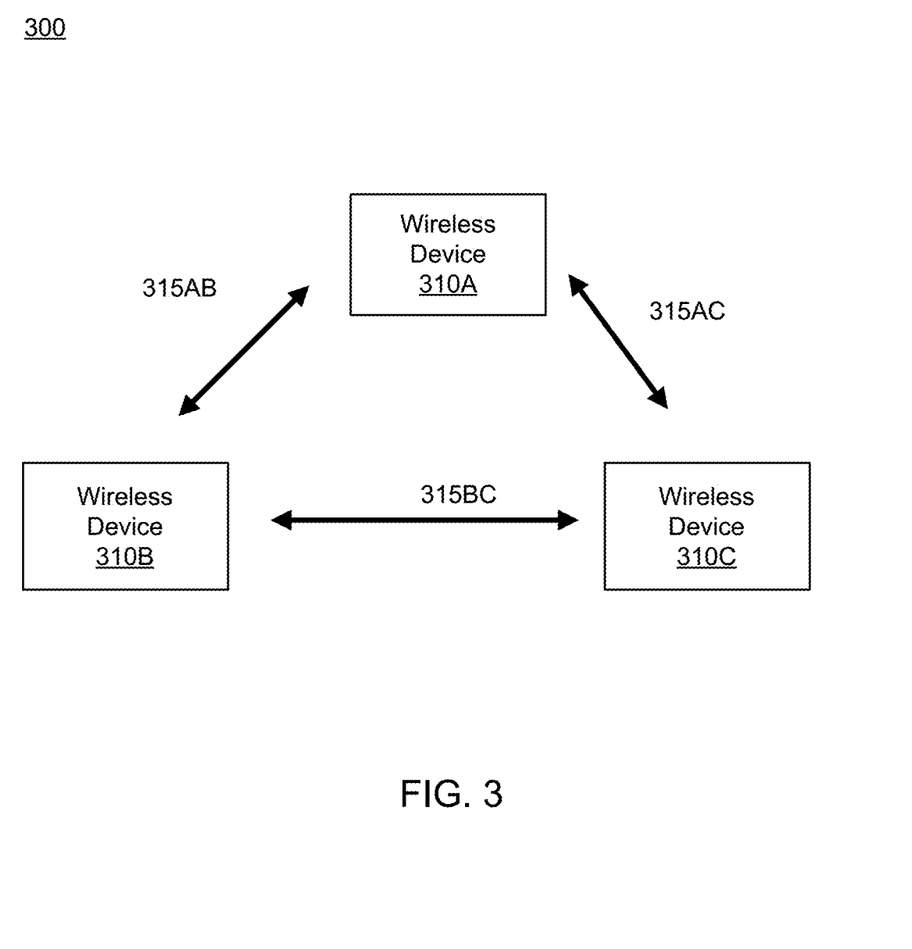
FIG. 3 is a diagram of a system environment including multiple wireless devices in communication, according to an example implementation of the present disclosure.

FIG. 3 is a diagram of a system environment 300 including multiple wireless communication devices 310A, 310B, 310C (also referred to as "wireless devices 310A, 310B, 310C") in communication, according to an example implementation of the present disclosure. In one aspect, the wireless devices 310A, 310B, 310C may communicate with each other through communication links 315AB, 315BC, 315AC. The communication links 315AB, 315BC, 315AC may be wireless communication links (e.g., Wi-Fi). Each wireless device 310 may be a laptop, a smart phone, a tablet PC, a wireless mouse, a wireless keyboard, a wireless speaker, a wireless headphone, a wireless headset, a wireless microphone, or any device communicating over a wireless communication link. In some embodiments, the wireless device 310A may be an access point (AP) and the wireless device 310B may be the console 110 or the HWD 150. In some embodiments, the wireless device 310A may be the console 110 operating as a soft AP, and the wireless device 310B may be the HWD 150. In some embodiments, the system environment 300 includes additional wireless devices 310 than shown in FIG. 3.

In some embodiments, the wireless devices 310A, 310B may be operable according to restricted TWT protocol/configuration/operation, where the wireless device 310C may not be operable according to the restricted TWT protocol/configuration/operation. For example, the wireless devices 310A, 310B may be Wi-Fi devices with capabilities to support extremely high throughput (EHT), where the wireless device 310C may be a legacy Wi-Fi device without a capability to support EHT. In one example, the wireless devices 310A, 310B may reserve a restricted service period, and communicate with each other during the restricted service period. The wireless device 310A or 310B may transmit, unicast, or broadcast a signal or a frame to cause other devices (e.g., wireless device 310C) to refrain from transmitting during the restricted service period and can avoid interfering with the communication between the wireless devices 310A, 310B.

In one aspect, the wireless device 310A may also transmit, unicast, or broadcast a quiet element (or a quiet channel element) to disable/prevent transmission by the wireless device 310C during a quiet period, because the wireless device 310C may not support the restricted TWT protocol/operation, but may be operable (e.g., can operate) according to the quiet element's indication/configuration. The quiet period may overlap with the restricted service period, such that the wireless device 310C may not transmit during the restricted service period in response to the quiet element. Meanwhile, the wireless device 310B may selectively respond to the quiet element. For example, the wireless device 310B may stop or refrain from transmission during the quiet interval, according to the quiet element. Alternatively, the wireless device 310B may ignore the quiet element, and transmit data during the restricted service period irrespective of (e.g., by ignoring or overriding) the quiet element. The wireless device 310B may determine to ignore the quiet element or operate according to the quiet element, based on a defined rule or a separate indication indicating whether the wireless device 310B should ignore the quiet element.

In one example, the wireless device 310A announces the restricted TWT schedule by carrying the restricted TWT information element (IE) in a beacon frame, a probe Response frame, a fast initial link setup (FILS) discovery frame, or a basic service set (BSS) discovery frame. The indication to ignore the quiet element may be provided with the restricted TWT IE. In this example, the indication to ignore the quiet element may be applicable to all member devices that participate in the specific schedule (e.g., for restricted TWT). In one aspect, as beacon frames are transmitted every time interval measured in time units (TBTT), the wireless device 310A can update this indicator's value in a next beacon frame to be transmitted to change/control the timing/occurrence/enablement of restricted TWT operation. Accordingly, the wireless device 310B may change or update its determination regarding whether to ignore the quiet element for one or more beacon(s), SP(s) 404 and/or duration(s).

In one example, the wireless device 310A provides the indication indicating whether to ignore the quiet element during a setup procedure between the wireless device 310A and the wireless device 310B. In this example, the indication may be provided to a specific wireless device (e.g., wireless device 310B) for the specific schedule or the SP 404 for restricted TWT operation.

By implementing the quiet element, one or more devices (e.g., wireless device 310C) that do not have a capability to support the restricted TWT operation will/may not interfere with the communication of latency sensitive data between the wireless devices 310A, 310B, during a restricted service period, while the wireless devices 310A, 310B that have capabilities to support the restricted TWT operation may be enabled (e.g., in wake up state) and communicate data during the service period despite the quiet element.

Figure 4:
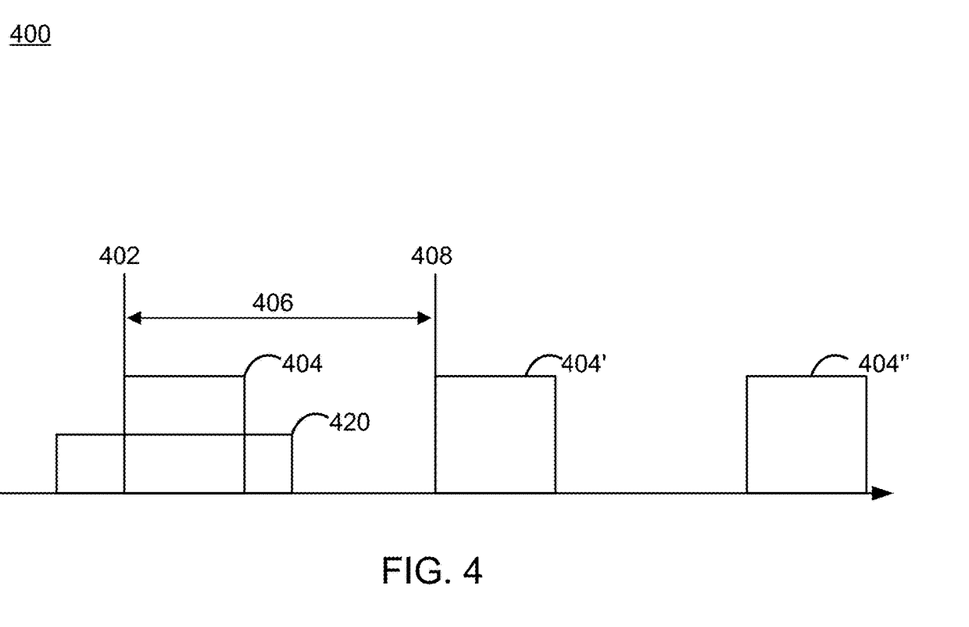
FIG. 4 is a timing diagram showing a wake-up/sleep schedule of a computing device utilizing TWT, according to an example implementation of the present disclosure.

FIG. 4 is a timing diagram 400 showing a wake-up/sleep schedule based on TWT, according to an example implementation of the present disclosure. The wireless devices 310A, 310B may negotiate to reserve or schedule a periodic time interval 406, and/or a service period (SP) 404, 404', 404". In one example, the time interval 406 is or corresponds to a frame time (e.g., 11 ms) of presenting artificial reality. Within the time interval 406, the wireless device 310A, the wireless device 310B, or both may be enabled during a SP 404, and can be disabled for the remaining duration of the time interval 406. During the SP 404, the wireless devices 310A, 310B may communicate data (e.g., artificial reality data) with each other. By disabling communication (e.g., by having one or both devices to enter sleep or low-power mode) during the remaining duration of the time interval 406, the wireless device 310A, the wireless device 310B, or both can reduce power consumption.

In one approach, the wireless device 310A or the wireless device 310B may transmit, unicast, or broadcast a signal or a frame to cause other devices (e.g., wireless device 310C) to refrain from transmission during the SP 404. The signal or frame may indicate a start time 402 of a time interval 406, an end time 408 of the time interval 406, a SP 404, etc. The signal or frame may be provided in a beacon frame, a probe response frame, a FILS discovery frame, or a BSS discovery frame. The signal or frame may also indicate which devices are allowed to communicate during the SP 404. In response to the signal or frame, other devices that can decode the signal or frame and operate according to such a signal or frame, may refrain from transmission during the SP 404 to obviate interfering with the communication between the wireless devices 310A, 310B. For example, the wireless device 310C may transmit data after the end of the SP 404, but may disable transmission before the next start time 408 of the SP 404', regardless of whether the wireless device 310C has completed its transmission or not, such that the wireless device 310C may not interfere with the communication between the wireless devices 310A, 310B during the reserved/restricted SP 404, 404'.

In one approach, the wireless device 310A or the wireless device 310B may also transmit, unicast, or broadcast a quiet element to cause one or more wireless devices to refrain from transmission during a quiet period 420. The quiet element may be (or be part of) a signal or frame compatible with a legacy 802.11 protocol. The quiet element may be transmitted before, after or together with the signal or frame conforming to a restricted TWT operation. In case the wireless device 310C is a legacy wireless device and is not operable according to the signal or frame conforming to the restricted TWT operation, the wireless device 310C may still operate according to the quiet element and refrain from transmission during the quiet interval specified by the quiet element. In one aspect, the quiet period 420 may fully or partially overlap with the SP 404, such that the wireless device 310C may not transmit or attempt to transmit during the SP 404, in response to the quiet element.

In one aspect, the wireless device 310B that has a capability to support the restricted TWT protocol may receive the quiet element and may selectively respond to the quiet element. For example, the wireless device 310B may refrain from transmission during the quiet period 420, according to the quiet element. Alternatively, the wireless device 310B may ignore the quiet element, and can transmit data during the restricted SP 404 irrespective of the quiet element's indication/instruction. The wireless device 310B may determine to ignore the quiet element or operate according to the quiet element, based on a predefined rule or an indication indicating whether the wireless device 310B should ignore the quiet element. For example, the wireless device 310A may transmit, unicast, or broadcast another indication indicating that the wireless device 310B may ignore the quiet element. The indication may be transmitted before, after or together with the quiet element. In response to the indication, the wireless device 310B may determine to ignore the quiet element, and can perform communication with the wireless device 310A during the SP 404.

Figure 5:
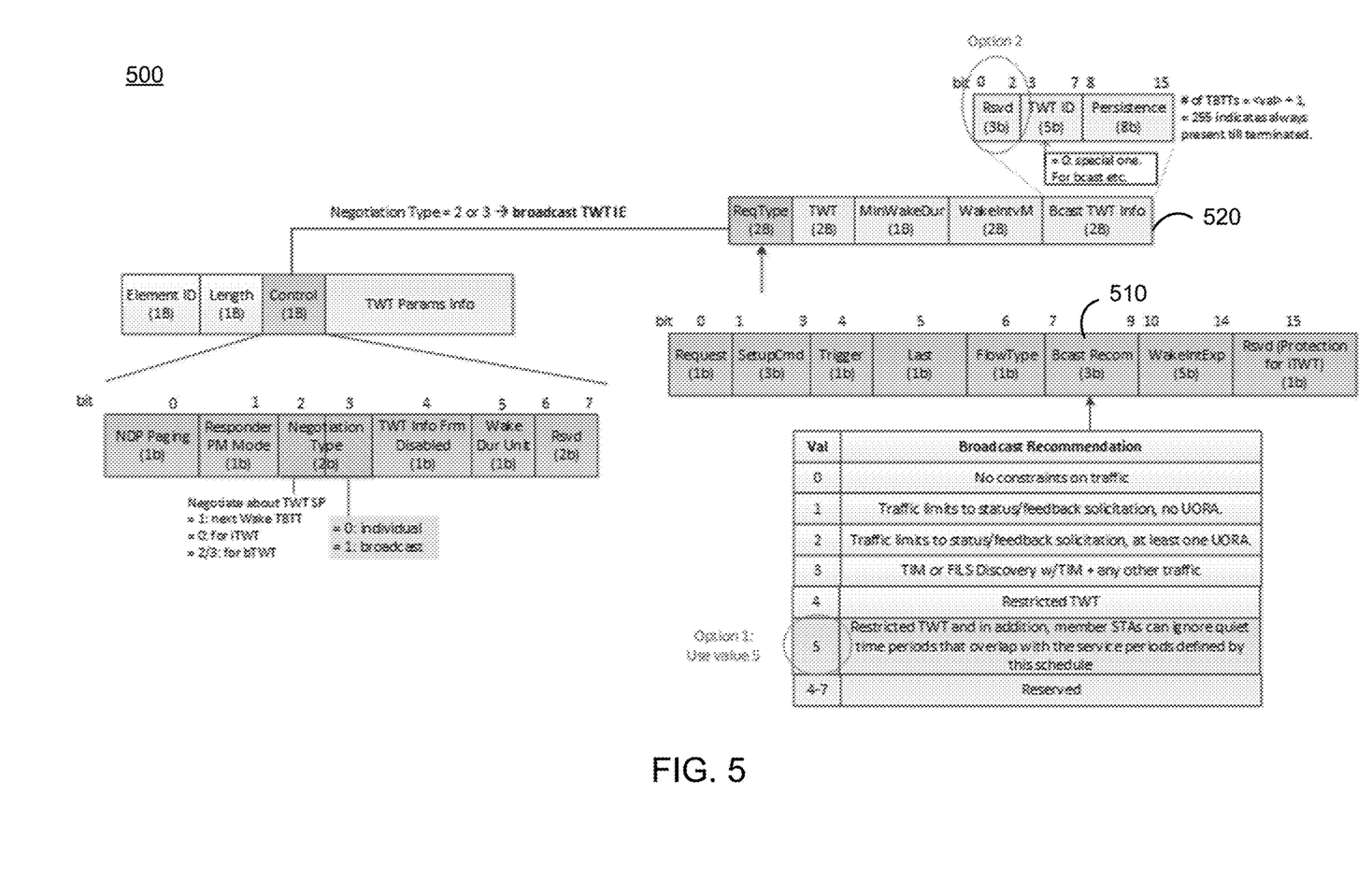
FIG. 5 is an example frame including an indication that indicates whether another indication to stop transmission during a service period can be ignored or not, according to an example implementation of the present disclosure.

FIG. 5 is an example frame 500 including an indication that indicates whether another indication to stop transmission during a service period can be ignored or not, according to an example implementation of the present disclosure. In some embodiments, the indication is provided in a broadcast recommendation subfield 510 or in a broadcast TWT information subfield 520. In one example, value 5 (or any unused value) in the broadcast recommendation subfield 510 may be designated/utilized to indicate that the SP 404 for restricted TWT, and members of the SP 404 allowed for communication can ignore any overlapping quiet period 420 advertised by the wireless device (e.g., wireless device 310A). In one example, unused or reserved bit(s) in the broadcast TWT information subfield 520 may be utilized to indicate that for a restricted TWT schedule or SP 404 (e.g., as indicated by the broadcast Recommendation subfield set to value 4), a member of the SP 404 (e.g., wireless device 310B) can ignore any overlapping quiet period 420 advertised/indicated/specified by the wireless device 310A.

Figure 6:
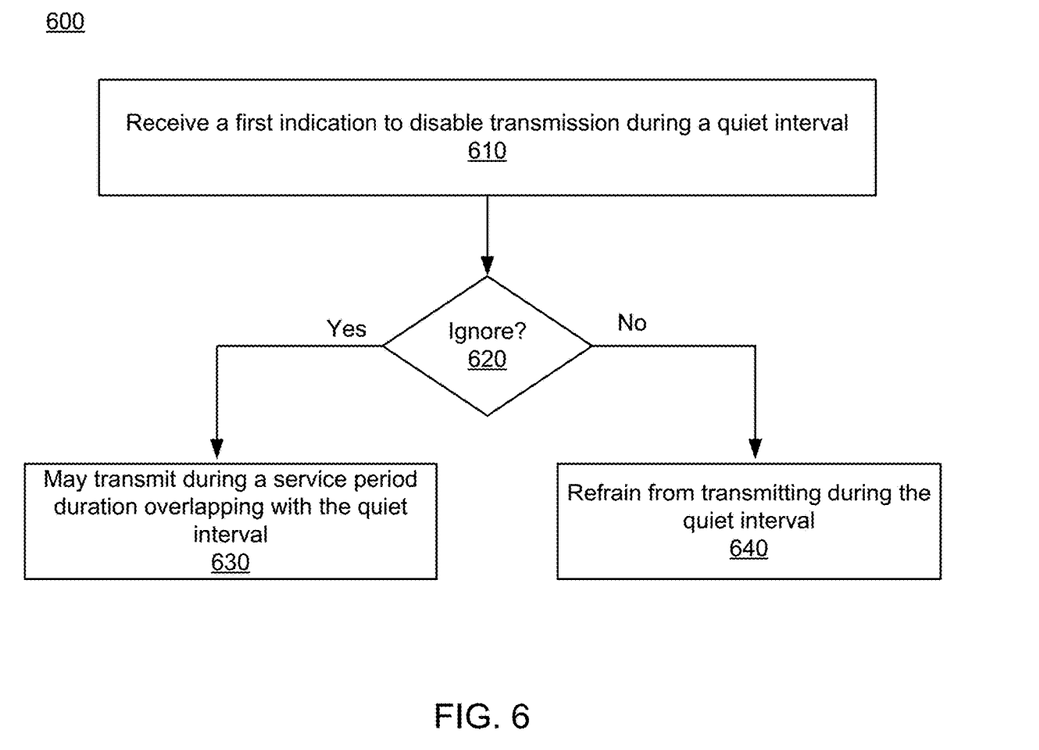
FIG. 6 is a flow chart showing an example process of managing communication during a service period overlapping a quiet period, according to an example implementation of the present disclosure.

FIG. 6 is a flow chart showing an example process 600 of managing communication during a service period overlapping a quiet period, according to an example implementation of the present disclosure. In some embodiments, the process 600 is performed by the wireless device 310B that can decode and operate according to restricted TWT operation and a quiet element's indication/configuration. In some embodiments, the process 600 is performed by other devices. In some embodiments, the process 600 includes more, fewer, or different components than shown in FIG. 6.

In one approach, the wireless device 310B receives 610 a first indication (e.g., a quiet element) to disable transmission during a quiet period 420. The first indication may be a quiet element conforming to IEEE 802.11 protocol. In one aspect, the quiet period 420 may overlap with the SP 404 of a restricted TWT operation/schedule, to reserve communication between the wireless devices 310A, 310B. The first indication may be transmitted by the wireless device 310A to prevent the wireless device 310C from transmitting during a quiet period 420.

In one approach, the wireless 310B may determine 620 whether to ignore/disregard the first indication. The wireless device 310B may determine to ignore the first indication according to a predetermined rule, indicating to the wireless device 310B to ignore the first indication. For example, the predetermined rule may specify that if a wireless device (e.g., wireless device 310B), which is a member of a restricted TWT schedule, determines that a quiet period 420 advertised/specified by another wireless device (e.g., wireless device 310A) in the transmitted quiet element overlaps (e.g., in part or in whole) with the SP 404 determined according to the restricted TWT schedule, the wireless device (e.g., wireless device 310B) may ignore the quiet element and is allowed to transmit during that SP 404. The wireless device 310B may determine to ignore the first indication according to a second indication from the wireless device 310A indicating that the wireless device 310B is to ignore the first indication (or quiet element), if the quiet period 420 overlaps with the SP 404. The wireless device 310A may provide the second indication to the wireless device 310B before, after, or together with the first indication. The wireless device 310B may determine whether to ignore the first indication as indicated by the second indication.

In response to determining to ignore the first indication, the wireless device 310B may transmit 630 during the SP 404 overlapping the quiet period 420. In response to determining to follow (or not ignore) the first indication, the wireless device 310B may refrain 640 from transmission during the quiet period 420.

Advantageously, by implementing the quite element, one or more devices (e.g., wireless device 310C) that do not have the capability to support the restricted TWT operation will/ may not interfere with other devices' communication of latency sensitive data during a restricted service period. Meanwhile, one or more communication devices (e.g., wireless device 310B) that have the capability to support the restricted TWT operation may still communicate data during the restricted service period despite the quiet element.

Figure 7:
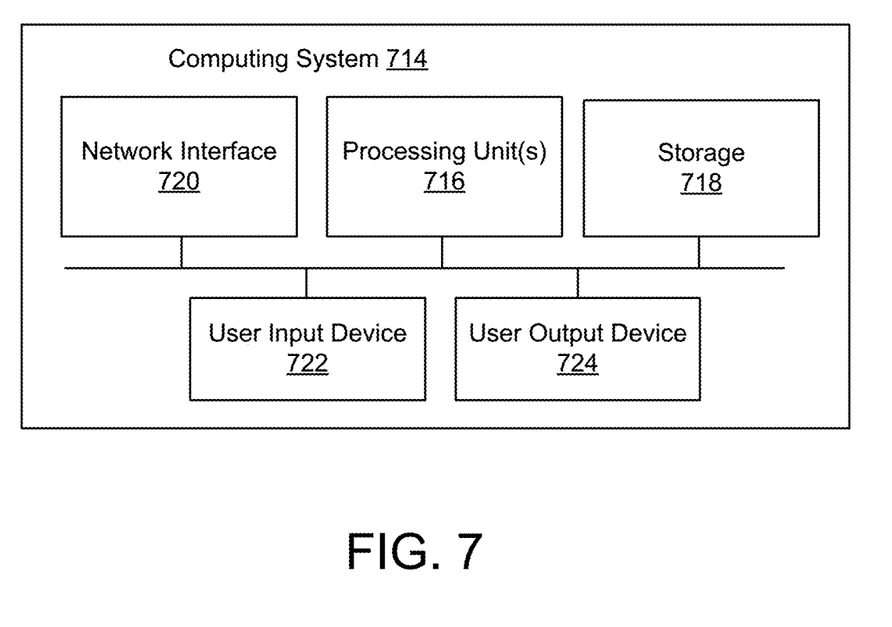
FIG. 7 is a block diagram of a computing environment according to an example implementation of the present disclosure.

Various operations described herein can be implemented on computer systems. FIG. 7 shows a block diagram of a representative computing system 714 usable to implement the present disclosure. In some embodiments, the console 110, the HWD 150, the wireless device 310A, 310B, 310C or any combination of them can be implemented by the computing system 714. Computing system 714 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 714 can be implemented to provide VR, AR, MR experience. In some embodiments, the computing system 714 can include conventional computer components such as processors 716, storage device 718, network interface 720, user input device 722, and user output device 724.

Network interface 720 can provide a connection to a wide area network (e.g., the Internet) to which WAN interface of a remote server system is also connected. Network interface 720 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 722 can include any device (or devices) via which a user can provide signals to computing system 714; computing system 714 can interpret the signals as indicative of particular user requests for information. User input device 722 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 724 can include any device via which computing system 714 can provide information to a user. For example, user output device 724 can include a display to display images generated by or delivered to computing system 714. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 724 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 716 can provide various functionality for computing system 714, including any of the functionality described herein as being performed by a server or client, or other functionality associated with message management services.

It will be appreciated that computing system 714 is illustrative and that variations and modifications are possible. Computer systems used in connection with the present disclosure can have other capabilities not specifically described here. Further, while computing system 714 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
receiving, by a wireless communication device from a wireless communication node, a frame including a first indication to the wireless communication device to disable transmission during a quiet period;
receiving, by the wireless communication device from the wireless communication node, another frame including a second indication in a broadcast recommendation subfield; and
determining, by the wireless communication device, to ignore the first indication for the quiet period, responsive to the second indication and responsive to the quiet period overlapping with a restricted service period of a restricted target wake time (TWT) schedule.

2. The method of claim 1, comprising:
performing or enabling, by the wireless communication device, the transmission during the quiet period, according to the determining.

3. The method of claim 1, wherein determining to ignore the first indication comprises:
determining, by the wireless communication device, to ignore the first indication according to a configuration or default rule.

4. The method of claim 1, wherein the second indication comprises: a defined value in the broadcast recommendation subfield.

5. The method of claim 4, wherein the broadcast recommendation subfield is in a TWT information element (IE).

6. The method of claim 4, wherein the broadcast recommendation subfield is in a beacon frame, a probe response frame or a basic service set (BSS) discovery frame.

7. The method of claim 1, comprising:
receiving, by the wireless communication device from the wireless communication node, an updated second indication after receiving the second indication; and
determining, by the wireless communication device, to enable or perform the transmission during the quiet period, responsive to the updated second indication.

8. The method of claim 1, wherein the quiet period includes the restricted service period of the TWT schedule.

9. The method of claim 1, wherein the quiet period partially overlaps with the restricted service period of the TWT schedule.

10. A wireless communication device, comprising:
a receiver configured to receive, from a wireless communication node, a frame including a first indication to the wireless communication device to disable transmission during a quiet period, and receive, from the wireless communication node, another frame including a second indication in a broadcast recommendation subfield; and
at least one processor configured to ignore the first indication for the quiet period, responsive to the second indication and responsive to the quiet period overlapping with a restricted service period of a restricted target wake time (TWT) schedule.

11. The wireless communication device of claim 10, wherein the at least one processor is further configured to:
perform or enable the transmission during the quiet period, by ignoring the first indication.

12. The wireless communication device of claim 10, wherein the at least one processor is configured to ignore the first indication according to a configuration or default rule.

13. The wireless communication device of claim 10, wherein the second indication comprises: a defined value in a broadcast recommendation subfield.

14. The wireless communication device of claim 13, wherein the broadcast recommendation subfield is in a TWT information element (IE).

15. The wireless communication device of claim 13, wherein the broadcast recommendation subfield is in a beacon frame, a probe response frame or a basic service set (BSS) discovery frame.

16. The wireless communication device of claim 10, wherein:
the receiver is further configured to receive, from the wireless communication node, an updated second indication after receiving the second indication; and
the at least one processor is further configured to enable or perform the transmission during the quiet period, responsive to the updated second indication.

17. The wireless communication device of claim 10, wherein the quiet period includes the restricted service period of the TWT schedule.

18. The wireless communication device of claim 10, wherein the quiet period partially overlaps with the restricted service period of the TWT schedule.

19. A method comprising:
sending, by a wireless communication node to a wireless communication device, a frame including a first indication to the wireless communication device to disable transmission during a quiet period; and
sending, by the wireless communication node to the wireless communication device, another frame including a second indication in a broadcast recommendation subfield, to control the wireless communication device to ignore the first indication for the quiet period, (1) responsive to the second indication and (2) responsive to the quiet period overlapping with a restricted service period of a restricted target wake time (TWT) schedule.

20. The method of claim 19, comprising:
sending, by the wireless communication node to the wireless communication device, an updated second indication after receiving the second indication to control the wireless communication device to determine, responsive to the updated second indication, to enable or perform the transmission during the quiet period.

* * * * *